(12) United States Patent
Chvaicer (10) Patent No.: US 10,739,185 B2
(45) Date of Patent: Aug. 11, 2020

(54) AUTOMATIC CALIBRATION DEVICE FOR CONVEYOR BELT INTEGRATING SCALES

(71) Applicant: Breno Chvaicer, São Paulo (BR)

(72) Inventor: Breno Chvaicer, São Paulo (BR)

( * ) Notice: Subject to any disclaimer, the term of this patent is extended or adjusted under 35 U.S.C. 154(b) by 291 days.

(21) Appl. No.: 15/740,435

(22) PCT Filed: Mar. 24, 2016

(86) PCT No.: PCT/BR2016/000033
§ 371 (c)(1),
(2) Date: Dec. 28, 2017

(87) PCT Pub. No.: WO2017/124158
PCT Pub. Date: Jul. 27, 2017

(65) Prior Publication Data
US 2018/0195893 A1  Jul. 12, 2018

(30) Foreign Application Priority Data

Jan. 21, 2016 (BR) .......................... 1020160014077

(51) Int. Cl.
  *G01G 23/01*  (2006.01)
  *G01G 11/02*  (2006.01)
  *G01G 11/00*  (2006.01)

(52) U.S. Cl.
  CPC .......... *G01G 23/01* (2013.01); *G01G 11/003* (2013.01); *G01G 23/012* (2013.01); *G01G 11/02* (2013.01)

(58) Field of Classification Search
  CPC .... G01G 11/006; G01G 23/01; G01G 23/012; G01G 11/02
  USPC ...................... 73/1.13; 177/50; 702/101, 175
  See application file for complete search history.

(56) References Cited

U.S. PATENT DOCUMENTS

| | | | | |
|---|---|---|---|---|
| 2,974,518 A | * | 3/1961 | Jones | G01G 11/006 73/1.13 |
| 3,976,150 A | * | 8/1976 | Wilson | G01G 11/006 177/16 |
| 4,480,705 A | * | 11/1984 | Raske | G01G 23/01 177/1 |

FOREIGN PATENT DOCUMENTS

| | | | | |
|---|---|---|---|---|
| CN | 102103006 A | * | 6/2011 | ............. G01G 11/04 |
| JP | 2006177942 A | * | 7/2006 | ........... G01G 23/012 |
| JP | 2006184279 A | * | 7/2006 | ........... G01G 23/012 |
| JP | 2017219500 A | * | 12/2017 | |

* cited by examiner

*Primary Examiner* — Jill E Culler
*Assistant Examiner* — Ruben C Parco, Jr.

(57) ABSTRACT

The automatic calibration device for integrating conveyor belt scales (100) is incorporated to a mounted-type integrating conveyor belt scale, mounted to bulk material conveyors, featuring a structure that supports racks with rolled cylinders, which, when assembled, are able to support the conveyor belt; the automatic calibration device (100) with the movement mechanism, comprised in this implementation, by a pair of parallelograms comprised of the beams (1) and (2) connected by rotating joints (7), (8), (9), (10) to the minor arms, (22), (23), (24), (25) which, in turn, are connected to the parallel shafts (3) and (4), with the distances between centers being equal to the distance between rotating joints of the beams; an actuator (14) is used to move standard weights (11) and (12), initially supported onto cavities (16), (17), (18) and (19) provided on the beams (1) and (2) of the parallelograms, until reaching the berths (30), (31), (32) and (33) connected to the weigh bridge (41) of the scale.

4 Claims, 7 Drawing Sheets

AUTOMATIC CALIBRATION DEVICE FOR CONVEYOR BELT INTEGRATING SCALES

RELATED APPLICATIONS

This application is a National Phase of PCT Patent Application No. PCT/BR2016/000033 having International filing date of Mar. 26, 2016, which claims the benefit of priority of Brazilian Patent Application No. 1020160014077 filed on Jan. 21, 2016. The contents of the above applications are all incorporated by reference as if fully set forth herein in their entirety.

FIELD AND BACKGROUND OF THE INVENTION

This Invention Patent application belongs to the field of equipment and devices used in association with conveyor belts, which may be used in various bulk transportation activities.

This Invention Patent application provides an automatic device for integrating conveyor belt scales, which brings safety and efficiency to calibration operation of scales mounted to conveyor belts, while avoiding unnecessary risks to people. The device object of this patent application applies to mounted-type integrating conveyor belt scales, mounted to bulk material conveyors, featuring a structure that supports racks with rolled cylinders, which, when assembled, are able to support the conveyor belt.

Integrating Conveyor Belt Scales require periodic calibration to ensure that measurements are within the tolerance thresholds for the service precision class, according to metrological requirements.

Standard calibration processes require complete stoppage of the respective conveyor, for manual input of standard weights in the form of independent masses, or streams of pre-measured masses of same length.

Devices that apply standard weights through various indirect mechanisms are present in the market; however, they must be manually activated and require the operator to be near the conveyor bed.

In addition to the aforementioned devices included in the state of the art, there is also U.S. Pat. No. 6,818,841 B1 of Nov. 16, 2004, which provides calibration through a computer-controlled weight input onto a conveyor line, without interruption of conveyor operation, and BRPI 0802249-6 (A2) of Aug. 4, 2009.

Manual calibration operation using standard weights presents risk to those performing the task, due to the fact that integrating scales are often installed in high places with limited protection, or unhealthy locations, and require handling of significant amounts of weight.

Even when the integrating scale is placed in a suitable location, there is serious risk of accident if the conveyor is moving, intentionally or otherwise.

When conveyor operators are required to be near the integrating scale, equipment stoppage may be requested due to occupational safety requirements.

Regarding U.S. Pat. No. 6,818,841 B1, it is found that the described object is subject to limitations which degrade the exactness of obtained calibrations, due to the fact that the load measurement mechanism is supported by joints with rollers, or fulcrums, or other bearings, and also due to part of the reaction to the weight force that acts upon the measurement rolls is exerted by the joints, and the rest is applied to the sensor, which may be a load cell or other type of force transducer.

Said mechanism features a limitation, which is that the attrition to the joints negatively affects the accuracy of the calibration process, as well as the weighing process itself.

One cannot assume that the reaction component is cancelled due to attrition, between calibration and use, as this attrition phenomenon is characterized by: non-repeatability, hysteresis, instabilities resulting from contamination, corrosion, variations in temperature, which may differ from the moment of calibration and weighing during operation.

SUMMARY OF THE INVENTION

Within the scope of the issues featured in the aforementioned state of the art. This invention patent application was developed, in order to provide a device which automatically carries out the application of standard weights, remotely controlled through electric signal, with no manual interference to the integrating scale and no need to stop the conveyor or for operators to be near the risk area.

Another objective of this invention patent application is to provide a device, which carries out the calibration upon automatic weight application over the weigh bridge of the integrating scale, through a transfer mechanism drive by a pneumatic, electric or hydraulic actuator, controlled by an external signal.

Yet another objective of this invention patent application is to propose a calibration device, in which the obtained incremental reading value is compared to the reference value, proportional to the standard weight applied. Values may be stored for auditing and traceability.

This invention patent application enhances the integrating conveyor belt scale calibration process, in which standard weights are automatically placed on the weigh bridge through a transportation mechanism, remotely controlled by signal, without interference of the operator on the conveyor.

This invention patent application enhances the transportation mechanism, comprised of a pneumatic, hydraulic or electric cylinder actuator, not attached to the scale structure, which remotely activates 2 shafts with opposite rotation directions attached to 2 combined parallelograms that deliver the standard weights to the berths at the weigh bridge and return to their original positions after a final calibration command.

This invention patent application enables permanent storage of standard weights in the integrating scale, making them readily available for frequent calibrations.

This invention patent application enables reduction of downtime for calibration of conveyor belts, allowing a higher degree of compliance in measurements, due to more frequent calibrations with minimum productivity losses.

This invention patent application increases safety of operators, as it does not require handling of standard weights near integrating conveyor belt scales.

This invention patent application enables addressing requirements at lower costs, such as quality compliance, metrology, and occupational safety.

This invention patent application also allows preservation of durability of integrating conveyor belt scales, as it smoothly and automatically deploys standard weights onto the weigh bridge, during the calibration process.

In this invention patent application, standard weights are driven by an actuator, synchronously transported during the calibration phase, without any attrition interference, enabling higher quality calibrations and measurements.

BRIEF DESCRIPTION OF THE SEVERAL VIEWS OF THE DRAWINGS

The device featured herein shall be described in detail, with reference to the following drawings, in which.

DESCRIPTION OF SPECIFIC EMBODIMENTS OF THE INVENTION

In accordance to the figures hereinabove, the automatic calibration device for integrating conveyor belt scales, an object of this invention patent application is indicated, in general, by reference number 100 and is arranged in a integrating conveyor belt scale model indicated as 150, which is the model shown in application PI018080048339, filed Jul. 31, 2008 and applied by the same author of this document, although it applies to several other types, setups and models.

Figure 1:
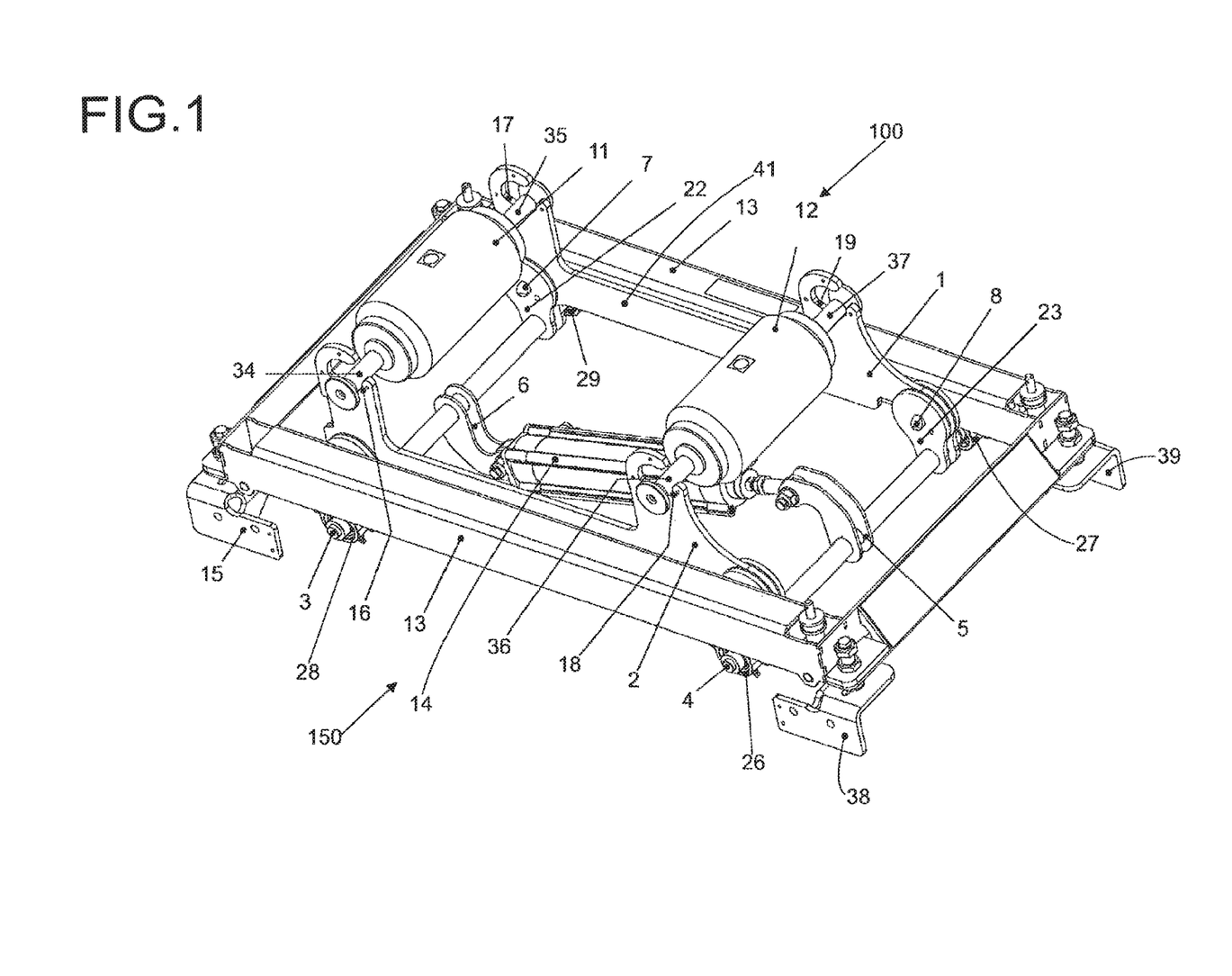
FIG. 1 shows a top perspective view of the automatic calibration device for integrating conveyor belt scales, with the actuator in a retreated position and standard weights in a rest position.
Figure 2:
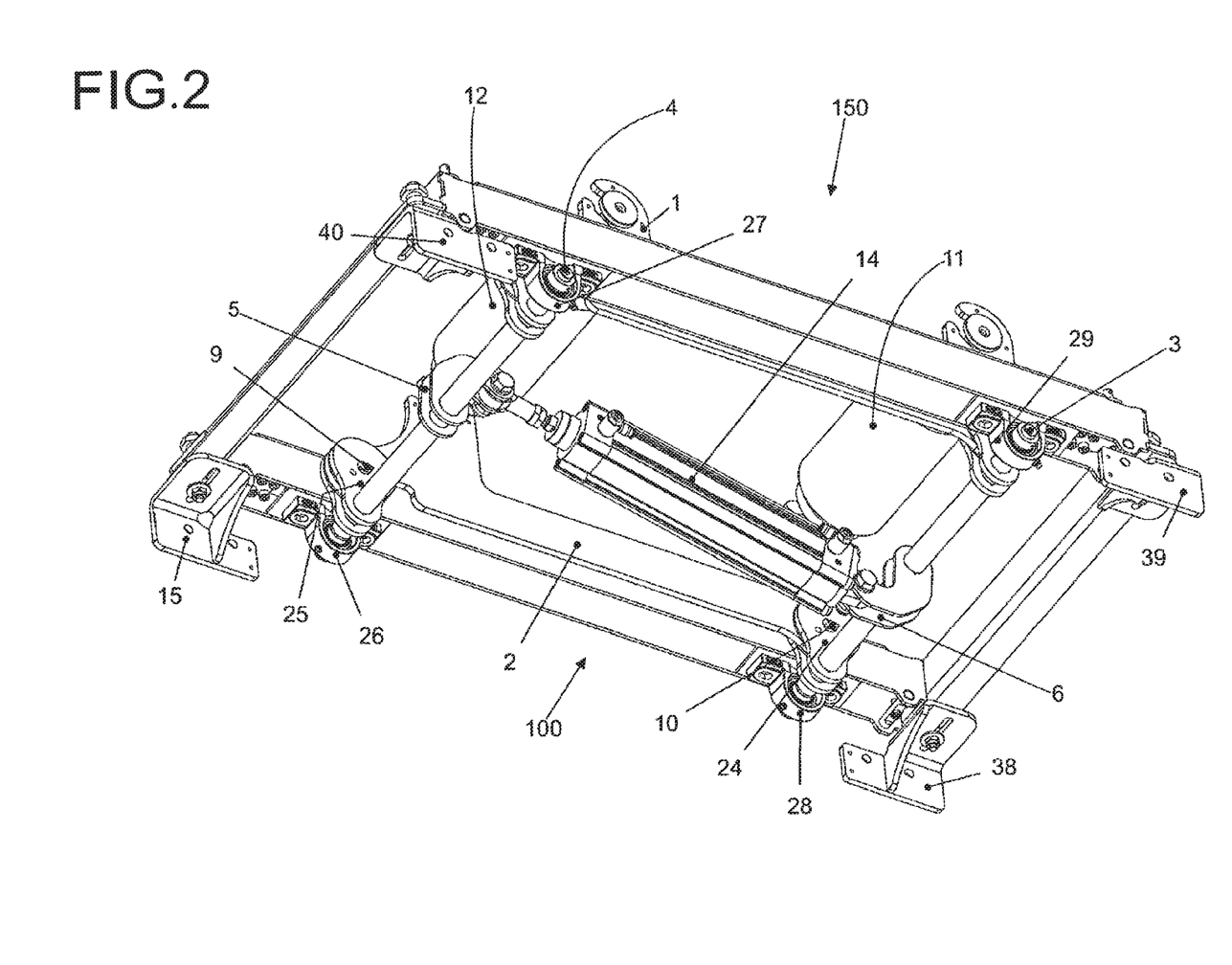
FIG. 2 shows a bottom perspective view of the automatic calibration device for integrating conveyor belt scales, with the actuator in a retreated position and standard weights in a rest position.

The transfer mechanism of this invention transports standard weights 11 and 12 (FIG. 1) from the resting berths 16, 17, 18 and 19 (FIG. 5) on beams 1, 2 (FIG. 1), to berths 30, 31, 32, 33 (FIG. 5) of the weigh bridge 41 (FIG. 5) of the integrating scale, after an expansion movement of the actuator 14 (FIG. 2), comprised herein of a pneumatic, hydraulic or electric device, connected by joints to lever arms 5 and 6 (FIG. 1), cooperating, respectively, with shafts 4 and 3 (FIG. 2) and in complementary and opposing angles (FIGS. 1 and 2).

The action of the cylinder plunger displaces the lever arm 5 (FIG. 1) which cooperates with shaft 4 (FIG. 1). The exercised force reaction is transmitted by the cylinder body to the symmetric and opposite lever 6 (FIG. 1), which cooperates with shaft 3 (FIG. 1).

The movement of the levers leads to rotation of shafts 3 and 4 in opposite directions.

Shafts 3 and 4 (FIG. 1) are cooperatively connected through arms 22, 23 (FIG. 1) and 24, 25 (FIG. 2), bound by joints 7, 8, 9, 10 (FIG. 4) respectively to the beams 1 and 2 (FIG. 1).

By Arrangement:

Joints 7, 8 (FIG. 1) are aligned in a coaxial model to respective joints 10, 9 (FIG. 2); distances between the joint and shaft rotation centers: 7 and 3, 8 and 4 (FIG. 1), 9 and 4, 10 and 3 (FIG. 2) are equal; distance between shafts 3 and 4 (FIG. 1) is equal to: the distance between the rotation centers of the joints 7 and 8 (FIG. 1) and also equal to the distance between rotation centers of the joints 9 and 10 (FIG. 2); shafts 3, 4 and rotation centers of joints 7, 8 (FIG. 1), 9, 10 (FIG. 2) are orthogonal to beams 1 and 2 (FIG. 1).

Bearings 26, 27, 28, 29 (FIG. 2), respectively on the ends of shafts 3 and 4 (FIG. 1), connect the set to the housing 13 (FIG. 1) of the integrating conveyor belt scale 150, which is fixed by the connection parts 15, 38, 39 and 40 (FIG. 2) to the conveyor structure connected to the ground.

The aforementioned assembly conditions comprise two mobile identical parallelograms, connected by shafts 3 and 4 (FIG. 1) formed by: 1) beam 1, joint 8, arm 23 connected to shaft 4, shaft 4, bearing 27, housing 13, bearing 29, shaft 3, arm 22 connected to shaft 3, joint 7; 2) beam 2, joint 9, arm 25 connected to shaft 4, shaft 4, bearing 26, housing 13, bearing 28, shaft 3, arm 24 connected to shaft 3, and joint 10.

Standard weights 11 and 12 (FIG. 1) include rods respectively (34, 35 and 36, 37 FIG. 1) which are initially supported on the resting berths 16, 17 and 18, 19 (FIG. 5), connected to beams 1 and 2 (FIG. 1) when not in calibration.

The calibration cycle consists in moving the standard weights from its rest positions until they are placed onto the weigh bridge, awaiting acquisition of calibration data and removing them back to the respective rest positions.

Due to the geometrical properties of the parallelogram, standard weights move simultaneously and in parallel to the scale housing.

There is no possibility of movement discrepancy between the right and left parallelograms, due to both being bound to each other by shafts 3, welded to arms 22 and 24 and by shaft 4, welded to arms 23 and 25 (FIGS. 1 and 2).

The connection of the beams 1 and 2 through welded arms 22, 23, 24, 25 prevents that one of the shafts (3 or 4) remains in place while the other moves.

Movement, in response to the electric command, takes place through driving the actuator 14 (FIG. 2), upon which the plunger 14A or shaft causes displacement of the arms 5 and 6 in opposite directions (FIG. 1), driving shafts 3 and 4 (FIG. 1) into rotating in different directions.

Rotation of shafts 3 and 4 moves arms 22, 23 (FIG. 1) and 24, 25 (FIG. 2) jointed to beams 1 and 2 (FIG. 1) of the parallelograms, which, in turn, moves standard weights 11, 12 (FIG. 1), placing them onto the berths 30, 31, 32, 33 (FIG. 5) of the weigh bridge 41 of the integrating scale. Actuator 14 remains activated for the entire calibration phase.

By arrangement, end of movement for the actuator corresponds to an end of movement for the parallelogram.

The movement route is done sufficiently beyond what is needed for transferring weights, causing resting berths to reach lower positions than the weigh bridge berths, so that calibration is not affected.

Figure 5:
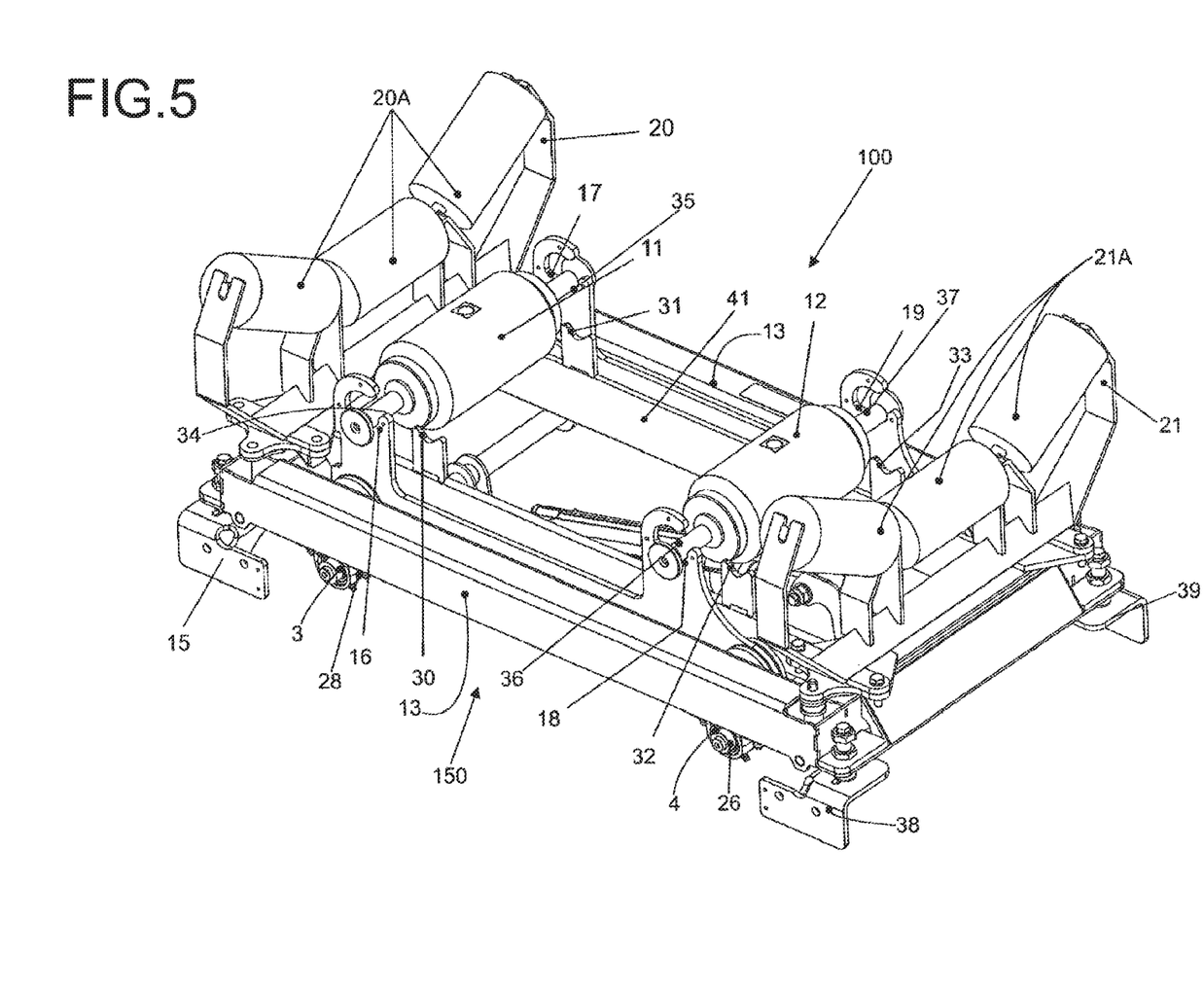
FIG. 5 shows a top perspective view of the automatic calibration device for integrating conveyor belt scales, with the actuator in a retreated position and standard weights in a rest position; the present view illustrates the presence of support structures of the conveyor belt rollers.

FIGS. 1, 2 and 5 show actuator 14 in a retreated position with standard weights 11 and 12 in a rest position, supported onto berths 16, 17, 18, 19 provided on beams 1 and 2.

Figure 3:
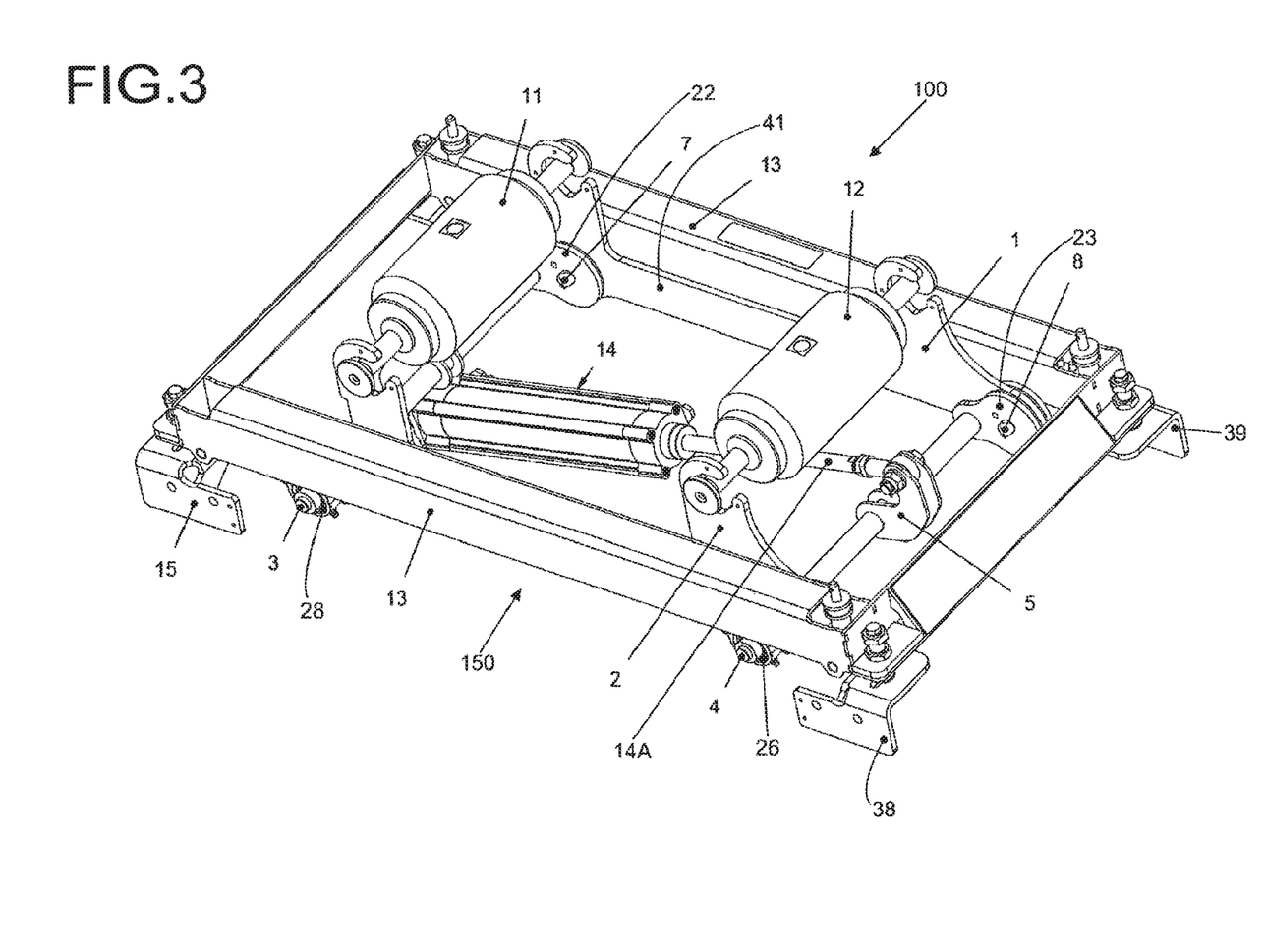
FIG. 3 shows a top perspective view of the automatic calibration device for integrating conveyor belt scales, which includes the actuator in an advanced position and standard weights in the calibration position.
Figure 4:
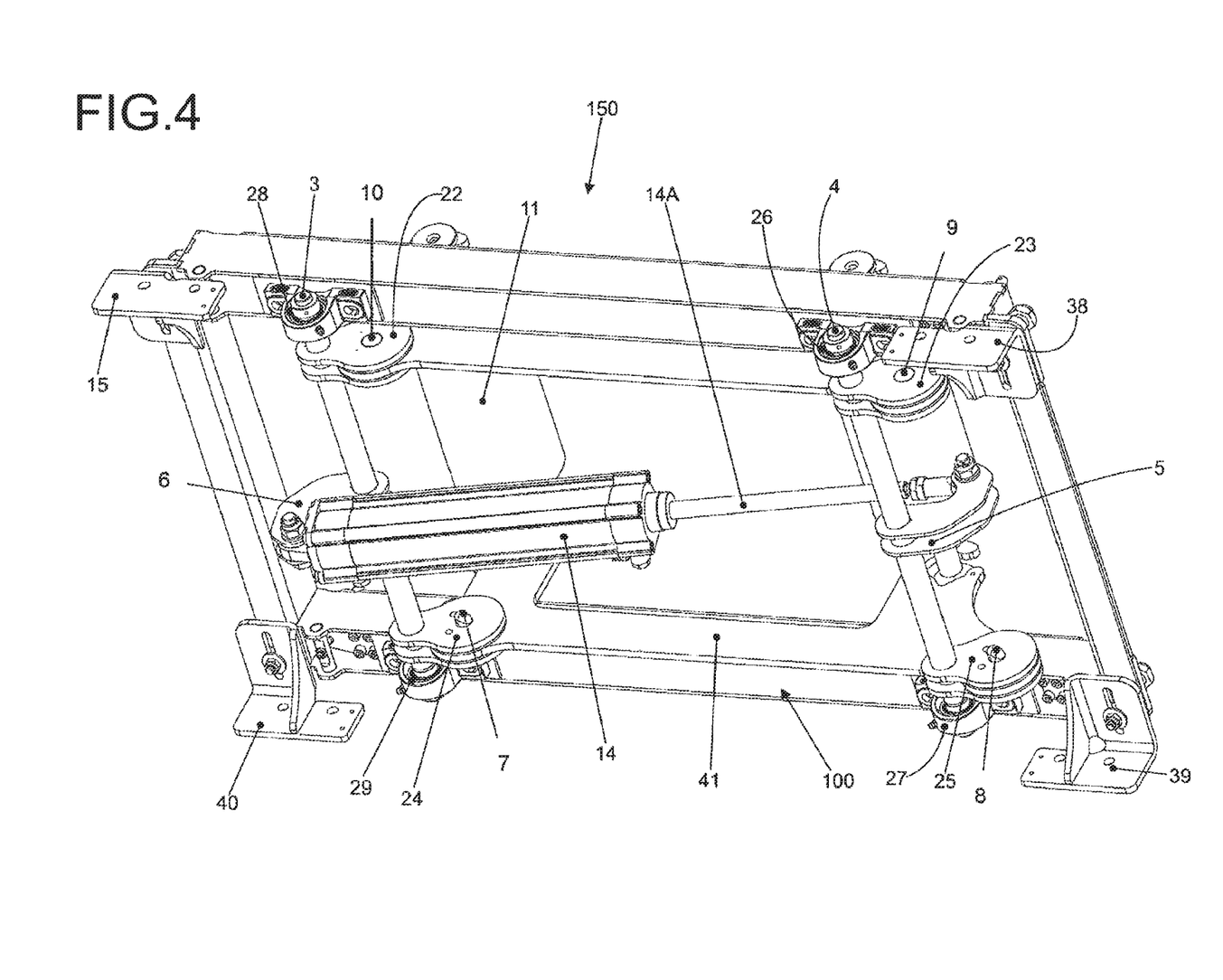
FIG. 4 shows a bottom perspective view of the automatic calibration device for integrating conveyor belt scales, which includes the actuator in an advanced position and standard weights in the calibration position.
Figure 6:
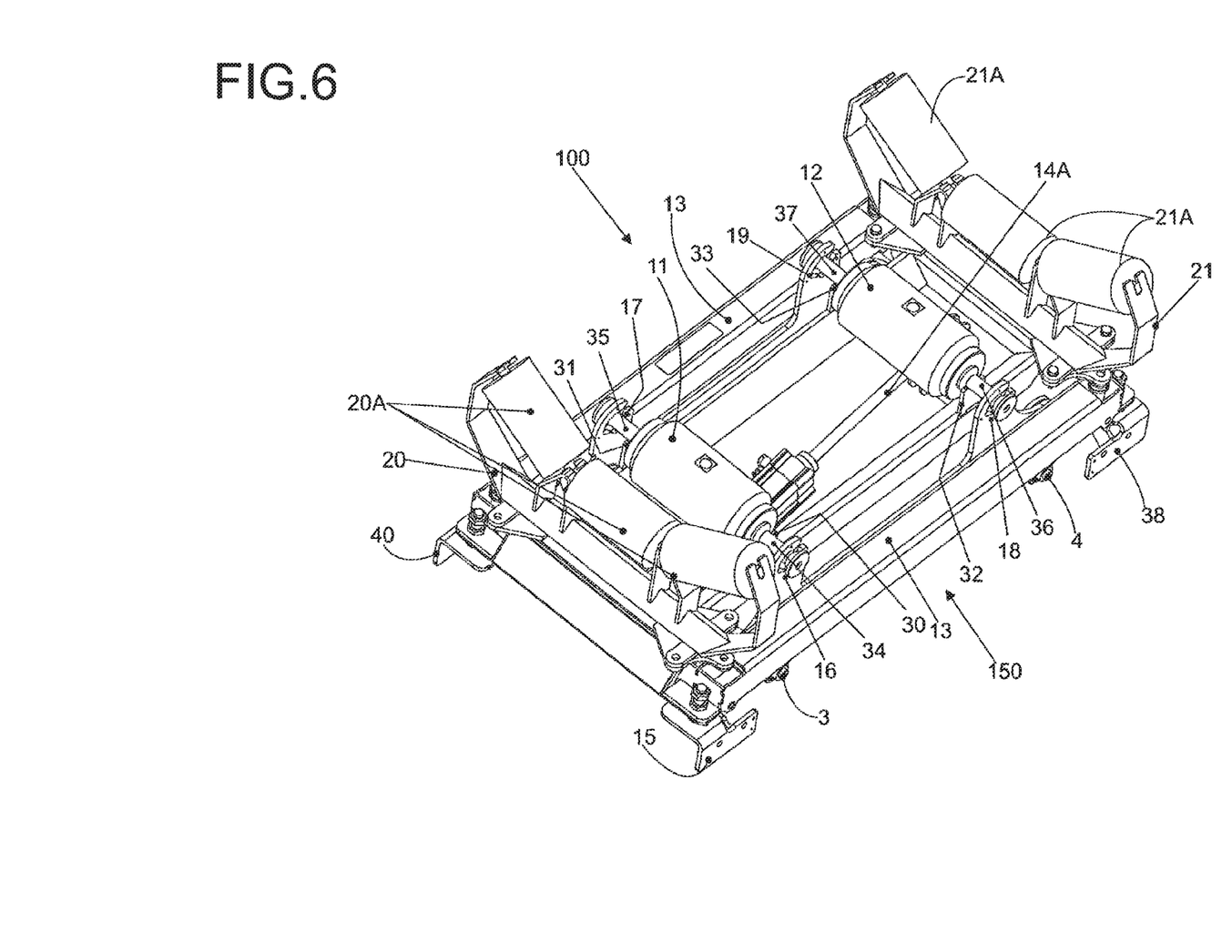
FIG. 6 shows a bottom perspective view of the automatic calibration device for integrating conveyor belt scales, with standard weights in a calibration position; the present view illustrates the presence of support structures of the conveyor belt rollers.
Figure 7:
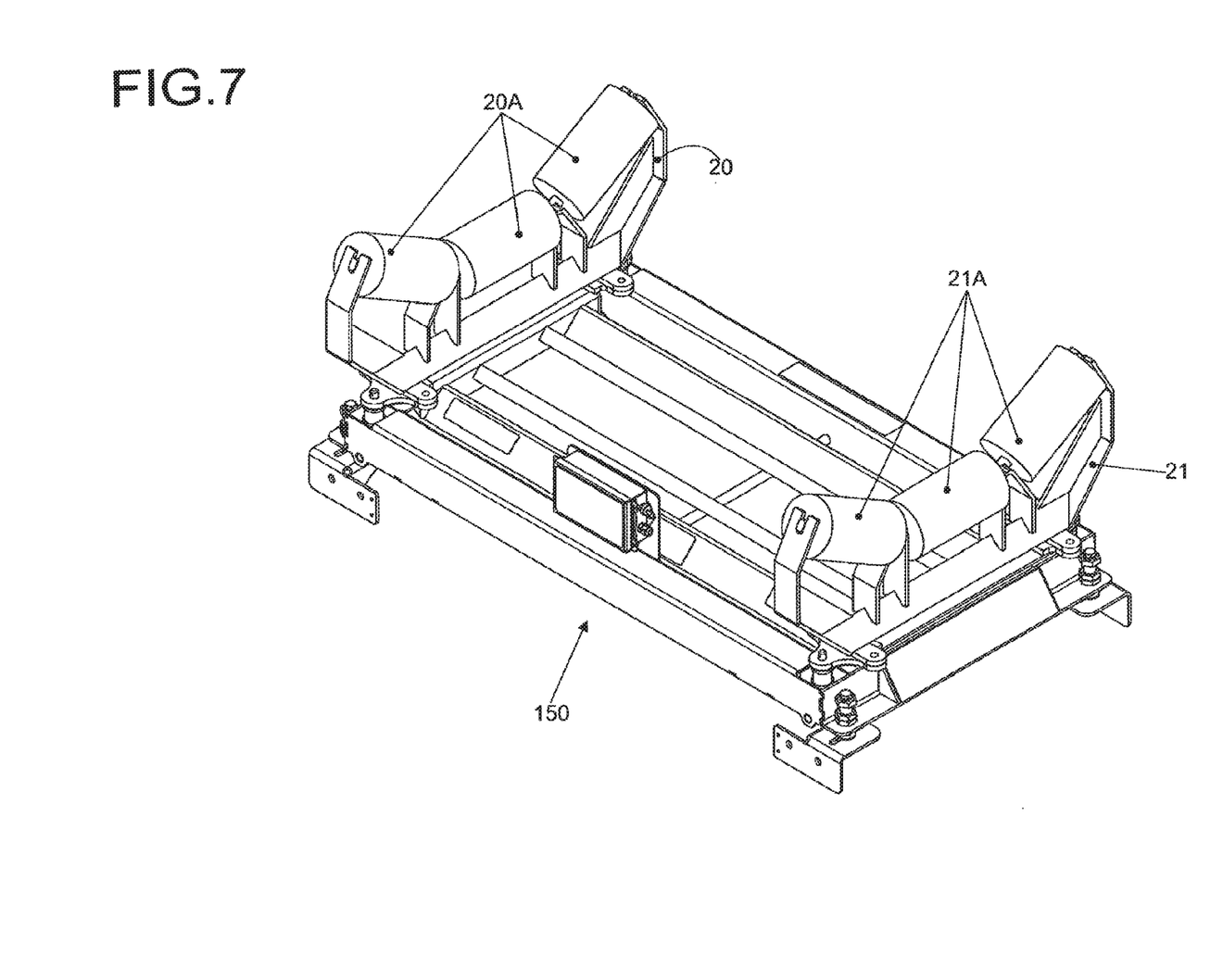
FIG. 7 shows a perspective view of the integrating conveyor belt scale of the state of the art upon which illustrations of the present device are based, pictured in the filed patent application n° PI018080048339 of Jul. 31, 2008, requested by the same author of this application, although it applies to several other types, setups and models.

On FIGS. 3, 4 and 6, the actuator 14 is seen in an advanced position, with standard weights 11 and 12 in a calibration position, supported onto berths 34, 35, 36, 37 of the weigh bridge, without touching the berths 16, 17, 18, 19, whose formats expect them to be positioned around the rods 34, 35, 36, 37 of standard weights 11 and 12, but without touching them, when the assembly is in the calibration position with the actuator in an advanced position.

At the end of the calibration, removal of standard weights 11 and 12 from the weigh bridge 41 takes place by inverting the movement of the actuator 14, from compression to traction.

The parallelogram rulers move reversely, removing standard weights 11 and 12 from the weigh bridge berths. Upon reaching the end of the retraction course, the standard weights 11 and 12 remain at rest, with rods 34, 35, 36, 37 (FIG. 6) in berths 16, 17, 18, 19 (FIG. 6).

In the drawings that illustrate the present application, support structures of the conveyor belt rollers are referenced as 20 and 21, and their respective rollers are identified as 20A and 21A.

What is claimed is:

1. An automatic calibration device (100) for an integrating conveyor belt scale having a weigh bridge (41) comprising berths (30, 31, 32, 33), the automatic calibration device (100) comprising:
    an actuator (14) comprising a cylinder plunger (14A);
    beams (1, 2) comprising rest berths (16, 17, 18, 19);
    standard weights (11, 12) respectively including rods (34, 35, 36, 37) configured to be supported on the rest berths when not in calibration;
    shafts (3, 4) cooperatively connected to the beams through respective arms (22, 23, 24, 25) bound by joints (7, 8, 9, 10);
    bearings (26, 27, 28, 29) respectively at the ends of the shafts, the bearings connecting the automatic calibration device (100) to a housing (13) of the integrating conveyor belt scale (150), the integrating conveyor belt scale being fixed by connection parts (15, 38, 39, 40) to a conveyor structure connected to the ground;
    lever arms (5, 6) connected respectively to the shafts; and
    a transfer mechanism configured to move the standard weights (11, 12) from the rest berths (16, 17, 18, 19) to the berths (30, 31, 32, 33) of the weigh bridge (41) upon an expansion movement of the cylinder plunger (14A), wherein the actuator (14) is connected by the joints (7, 8, 9, 10) to the lever arms (5, 6), the lever arms (5, 6) being connected to the shafts (3, 4) in complementary and opposite angles;
    wherein the expansion movement of the actuator (14) causes the lever arms (5, 6) to move apart such that the movement of the lever arms (5, 6) causes rotation of the shafts (3, 4) in the same rotational direction.

2. The automatic calibration device (100) according to claim 1, wherein a first plurality of the joints (7, 8, 9, 10) are coaxially aligned with each other, and a second plurality of the joints (7, 8, 9, 10) are coaxially aligned with each other;
    a first distance between a rotation axis of a first of the shafts (3, 4) and a rotation axis of a first plurality of the joints (7, 8, 9, 10) is equal to a second distance between a rotation axis of a second of the shafts (3, 4) and a rotation axis of a second plurality of the joints (7, 8, 9, 10);
    wherein a distance between the shafts (3, 4) is equal to a distance between the rotation axes of the first and second pluralities of joints (7, 8, 9, 10); and
    wherein the shafts (3, 4) and rotation axes of the first and second pluralities of joints (7, 8, 9, 10) are orthogonal to the beams (1, 2).

3. The automatic calibration device (100) according to claim 1, wherein two identical mobile parallelograms are defined by the automatic calibration device (100),
    a first of the parallelograms being defined by;
    a first of the beams (1, 2), a first of the joints (7, 8, 9, 10), a first of the arms (22, 23, 24, 25), a first of the shafts (3, 4), a first of the bearings (26, 27, 28, 29), the housing (13), a second of the bearings (26, 27, 28, 29), a second of the shafts (3, 4), a second of the arms (22, 23, 24, 25), and a second of the joints (7, 8, 9, 10), and
    a second of the parallelograms being defined by;
    a second of the beams (1, 2), a third of the joints (7, 8, 9, 10), a third of the arms (22, 23, 24, 25), the first of the shafts (3, 4), a third of the bearings (26, 27, 28, 29), the housing (13), a fourth of the bearings (26, 27, 28, 29), the second of the shafts (3, 4), a fourth of the arms (22, 23, 24, 25), and a fourth of the joints (7, 8, 9, 10).

4. The automatic calibration device (100) according to claim 1, wherein said automatic calibration device (100) is configured to be used in a calibration cycle comprising:
    moving the standard weights (11, 12) from the rest berths (16, 17, 18, 19) and placing the standard weights (11, 12) onto the weigh bridge (41), and
    awaiting an acquisition of calibration data and moving the standard weights (11, 12) back to the rest berths (16, 17, 18, 19);
    wherein moving the standard weights (11, 12) takes place upon a driving of the actuator (14) in which the actuator (14) moves the lever arms (5, 6) in opposite directions and drives the shafts (3, 4) in the same rotational direction;
    wherein rotation of the shafts (3, 4) moves the arms (22, 23, 24, 25), which causes movement of the standard weights (11, 12) onto the berths (30, 31, 32, 33) of the weigh bridge (41); and
    wherein the actuator (14) remains activated for the entire calibration cycle.

\* \* \* \* \*